A. F. DRAPER.
VEHICLE SEAT.
APPLICATION FILED MAY 16, 1910.

1,067,008.

Patented July 8, 1913.

3 SHEETS—SHEET 1.

WITNESSES:
Nellie B. Keating
[signature]

INVENTOR
A. F. Draper
BY
F. M. Wright,
ATTORNEY

A. F. DRAPER.
VEHICLE SEAT.
APPLICATION FILED MAY 16, 1910.

1,067,008.

Patented July 8, 1913.
3 SHEETS—SHEET 2.

WITNESSES:
Nellie B. Keating
[signature]

INVENTOR
A. F. Draper
BY
F. M. Wright.
ATTORNEY

A. F. DRAPER.
VEHICLE SEAT.
APPLICATION FILED MAY 16, 1910.

1,067,008.

Patented July 8, 1913.
3 SHEETS—SHEET 3.

WITNESSES:
Nellie B. Keating
Leon Boiller

INVENTOR
A. F. Draper,
BY
F. M. Wright,
ATTORNEY

UNITED STATES PATENT OFFICE.

ARTHUR F. DRAPER, OF BERKELEY, CALIFORNIA.

VEHICLE-SEAT.

1,067,008.  Specification of Letters Patent.  Patented July 8, 1913.

Application filed May 16, 1910. Serial No. 561,529.

*To all whom it may concern:*

Be it known that I, ARTHUR F. DRAPER, a citizen of Canada, residing at Berkeley, in the county of Alameda and State of California, have invented new and useful Improvements in Vehicle-Seats, of which the following is a specification.

The present invention relates to improvements in vehicle seats and especially the seats of automobiles, and the objects of the invention are, first, to provide either front or rear seats, or both, the backs of which shall be collapsible upon the seats, so that the frame or body of the seat when said back is so collapsed shall form a convenient box or receptacle and will also form a cover or closure for the cushions of said seat, thus preventing deterioration of said cushions through exposure to rain, fog, sunshine, dust or other destructive agencies, which seats moreover when collapsed shall be neat and attractive in appearance and when extended for use shall be as nearly as possible of the ordinary form and style of the seats now in use.

A further object of the invention is to provide a seat of this character which can be placed over a box such as is now commonly in use at the rear part of a one-seat automobile to form an additional seat when required, this seat being also collapsible to preserve the perishable parts thereof from deterioration.

A great advantage of my improvement is that the seats, being very easily closed and opened and expanded for use, may easily be kept clean until used.

Figure 1:
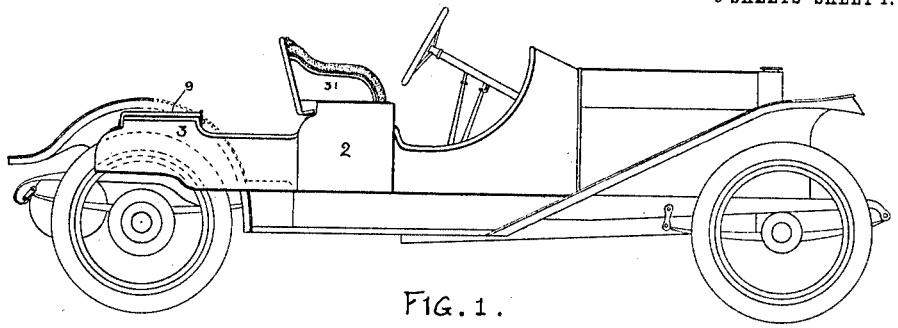
Figure 2:
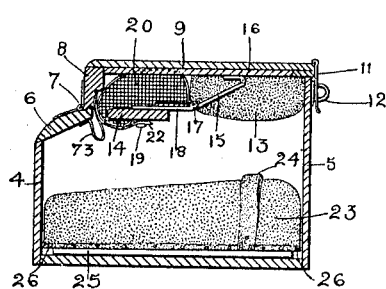
Figure 3:
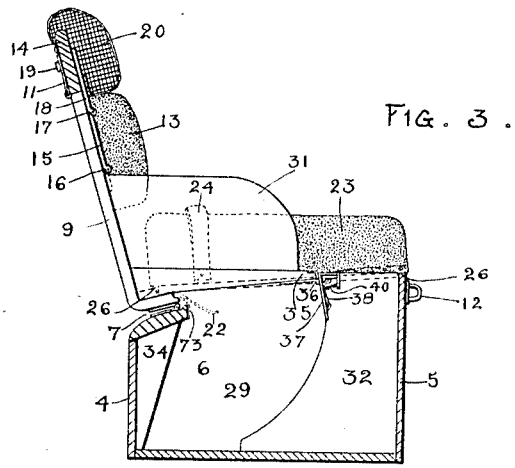
Figure 4:
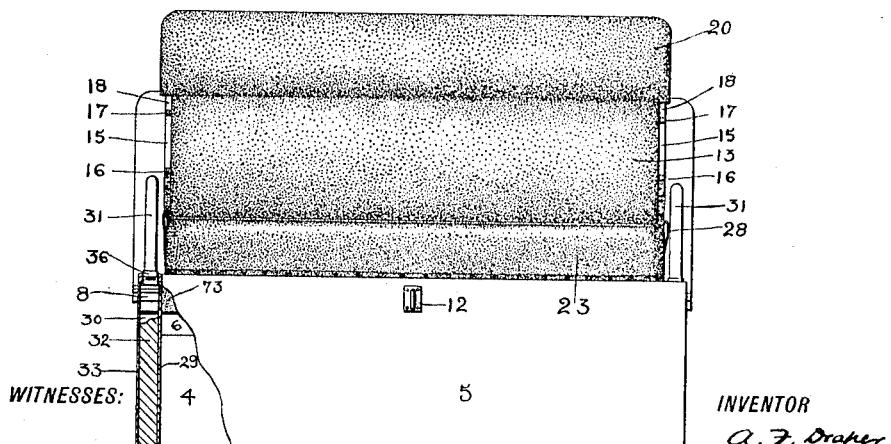
Figures 5, 6, 7, 8, 9:
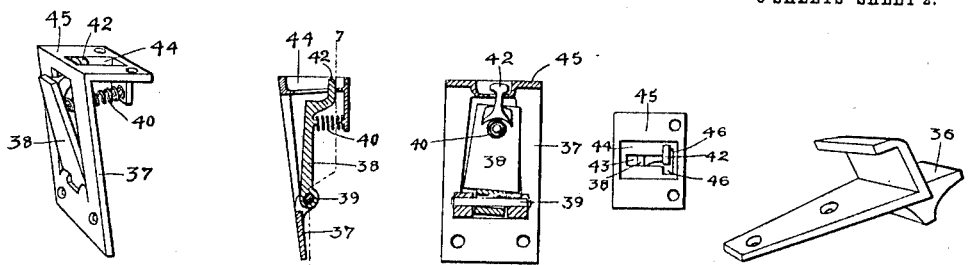
Figure 10:
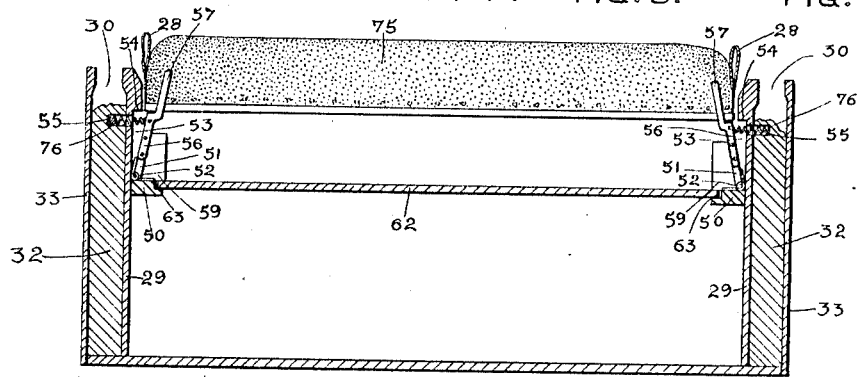
Figure 11:
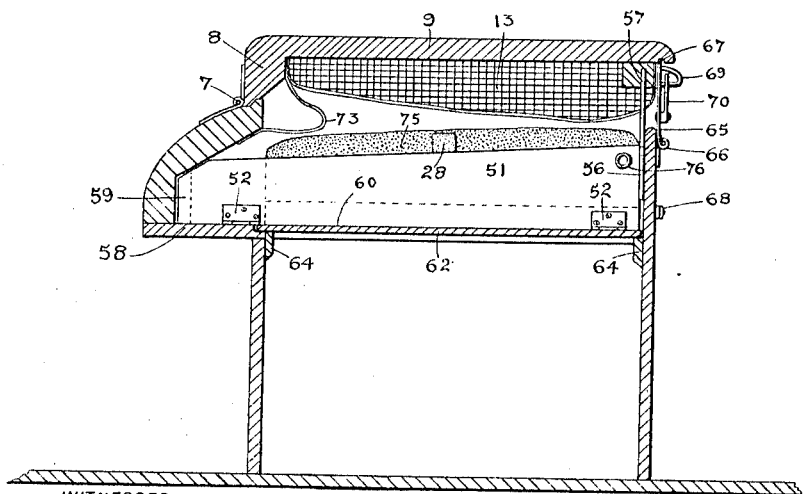
Figure 12:
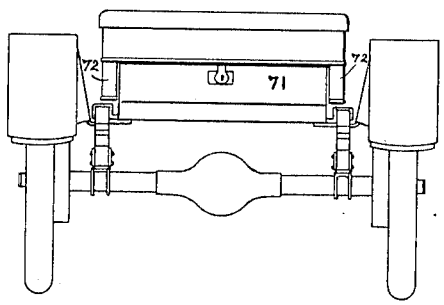
Figure 13:
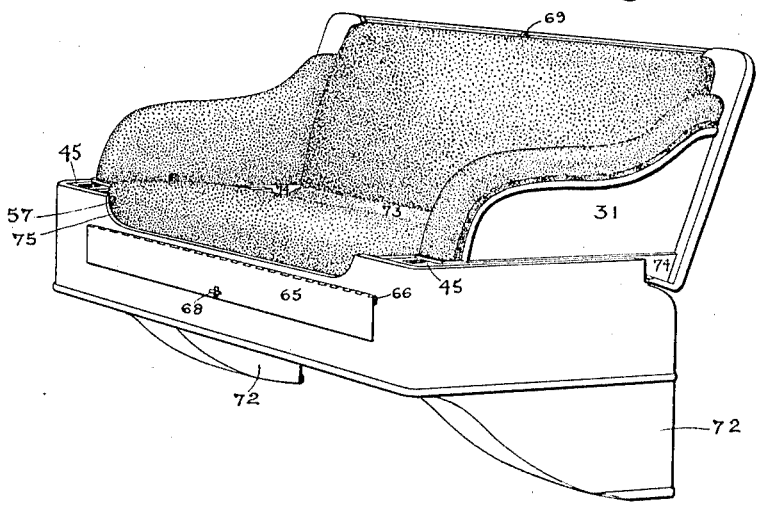
Figure 14:
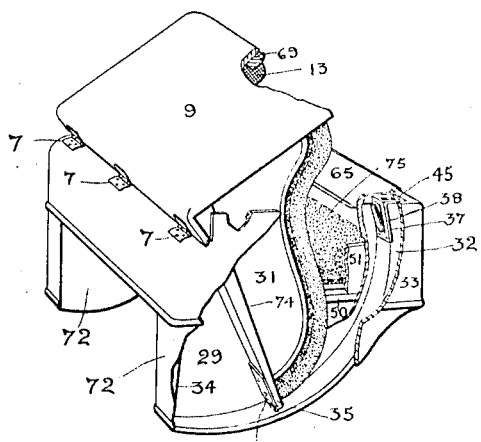

In the accompanying drawing, Figure 1 is a side view of an automobile having front and rear seats both constructed in accordance with my invention, the front seat being open and the rear seat closed; Fig. 2 is a longitudinal section of a closed rear seat constructed in accordance with my invention; Fig. 3 is a partly broken side view of the same opened; Fig. 4 is a front view of the same partly broken away; Fig. 5 is a detail perspective view of a seat latch; Fig. 6 is a vertical section of the same; Fig. 7 is a section of the same on the line 7—7 of Fig. 6; Fig. 8 is a top plan view of the same; Fig. 9 is a perspective view on an enlarged scale of a bolt for engaging said catch; Fig. 10 is a view of a front seat the back thereof being omitted showing the cushion raised, on a transverse section taken near the front edge thereof, the cushion being shown in front elevation; Fig. 11 is a longitudinal section of the front seat, the cushion being lowered, and the seat being closed; Fig. 12 is a rear view of an automobile equipped with a modification of my invention; Fig. 13 is a perspective view of the modified form of seat shown in Fig. 12, open; Fig. 14 is a perspective view, partly broken away, on a smaller scale, of the same seat, but partly closed.

Referring to the drawing, 1 indicates an automobile having a front seat 2 and a rear seat 3 constructed in accordance with my invention, the rear side 4 of the seat box is lower than the front side 5. Secured to the upper edge of said rear side is an inward and upward extension 6, which may be made in one piece with, or separately from, said rear side 4, to the upper edge of which is hinged on the outside, as shown at 7, the offset portion 8 of a combined back and cover 9. Said back 9 has hinged to its front or upper edge a hasp 11, which, when the seat is closed, is adapted to pass over a staple 12 secured near to the upper edge of the front side of the box and may thus be locked by a padlock. The back or cover is provided with a cushion 13. While it is desirable to provide a seat of ample size, it is of great importance to reduce the size of the box when closed to as small a size as possible in order to prevent the device from being clumsy and unusual in appearance. To accomplish this, I provide an extension 14 of the back, which is connected to the back proper by means of two links or arms 15, hinged as shown at 16 to the back. These arms 15 are also hinged as shown at 17 to arms 18 fixedly secured to the sides of the extension which is uniform in thickness and general appearance with the back proper. Since this extension is connected to the back by means of two hinges which swing in the same direction, it results that said extension can be swung from its closed portion, in which it lies underneath the lower part of the back cushion 13, to its open position, in which it extends above the upper portion of the back and in alinement therewith. When in this position, the lower edge of the extension fits snugly upon the upper edge of the back proper. It is secured in this position by means of the hasp 11, which is used to lock the cover to the box when closed, said hasp when the back is opened, and the extension is thrown back, passing over a turn button 19 at the back of said extension. The extension is provided with a cushion 20 which conforms in general appearance with the cushion 13, and said cushions 13 and 20 are so secured upon the back and extension respectively, that the edges of said cushions which contact when extended are out of alinement or offset from the contacting edges of the back and the extension. It is therefore difficult for dust to find its way through the crevice between said cushions. The cushion 13 covers only the upper portion of said back, so that, there is left a space adjacent to the back to receive the cushion 20, when the extension is folded down upon the back. Both of the hinges 16, 17, by which the extension is secured to the back, are so constructed as to prevent the arms 15 17 attached to one another by said hinges, swinging backward farther than a straight line. In closing the seat, the extension is successively swung down upon the hinges 17 and 16, and, when in this position, it is secured by a strap 22 having an eye passing over the button 19. When the back has been opened and the extension has been swung upward into the proper position, it is next required to place the seat proper 23 in position upon the box, as this seat, when not in use, is contained in the bottom of the box. The seat itself is larger than the opening through the top of the box, but it can be raised obliquely therethrough and is raised by means of two straps 24 attached to the sides of the seat. It then rests at its front edge upon the frame of the box and at its rear edge upon the offset portion of the back. For this purpose the bottom 25 of the seat frame is made smaller in the dimension from front to rear than the main body of the seat so as to leave front and rear shoulders 26, which rest upon their respective supports, while the part 25 extends downward below the shoulders, and by its lateral abutment against said supports prevents movement in a horizontal direction thereon, so that the seat is firmly secured and will not shake out. The seat 23 is made of a greater height at the rear than at the front and the rear support is at a slightly lower level than the front support. These differences are such that if the higher portion of the seat is to the rear, the upper level of the seat is substantially horizontal. Adjustment may be made, however, by turning the seat around, so that the higher portion thereof is at the front, in which case the seat will be given a backward slope.

The box is formed at each end with a false end or wall 29, at such distance from the corresponding end of the box as to leave a compartment 30 sufficiently wide to receive side arms 31 of the seat when swung down into place. Said arms 31 are secured to the back or cover and swing upward therewith, and they are rounded in the usual form for comfort and appearance. The compartments 30 are only provided at the rear portions of the ends of the box, the front portions, into which the side arms do not swing, being made solid, preferably by blocks 32 secured between the ends 33 and the false ends 29. Similarly, at the rear of the box, the spaces between the false ends and the ends of the box into which the side arms do not enter are filled up by blocks 34.

The side arms have at the bottom short projections 35, which, when the back and side arms are swung into place, are automatically locked and supported in the following manner: Upon the end of each projection is a bolt 36, and upon the upper rear corner of the corresponding block 32 is secured a latch or retainer frame 37 having a latch 38 hinged loosely on a pin 39 in the lower portion of said frame. A compressed spring 40 compresses said latch rearwardly. In the upward movement of the side arms and back the bolt 36, impinges upon the latch and presses said latch inwardly against the pressure of said spring 40. When said bolt has passed the upper end of said latch, said spring returns it to a position at the rear of the latch frame, in which position the upper surface of the bolt abuts against the under surface of the top of the opening for the latch, and the extent to which said latch is projected to the rear of said latch frame is limited by the under side of the bolt which is formed of a curvature greater than that of a circle having the length of the latch as radius, so that when said latch is pressed rearwardly by said spring, it is pressed tight against the under side of said bolt. It thus prevents rattling of these parts upon one another. Also the bolt is of the same width as the top of the opening for the latch, so as to prevent any lateral movement thereof. To withdraw said latches and allow the side arms and back to drop into their closed position, the latches are provided with forwardly extending fingers 42 which also extend upward each in a slot 43 formed in the bottom of a depressed portion 44 of the top or horizontal part 45 of the latch frame. Said depression is sufficient to enable the fingers to travel therein and at the same time be operated without extending above the horizontal portion of said latch frame. Said slots 43 are T-shaped in form, that is to say, at the front end of each slot there is a lateral extension 46 at each side thereof. The latch is purposely made with a loose hinge so as to permit it to have considerable side movement. Thus when the operator wishes to lower the seat back, he withdraws each latch in turn by pressing the finger 42 of said latch forwardly to the front portion of a corresponding slot 43 and then moves it sidewise into either lateral extension. The seat can then be dropped and the back closed. The lower part of the opening in the upright portion of the latch frame is wider than the latch which moves therethrough, so as to allow of considerable side movement of the latch.

In Figs. 10 and 11 are illustrated a front seat constructed in accordance with my invention. In many respects the construction of this front seat is similar to that of the rear, as, for instance, in the provision of the side arms and of the compartments for the same in the ends of the box. The blocks which fill the part of the space between the false ends and the ends proper of the box not occupied by the arms are shown at 32 in Fig. 10. In the case of the front seat, however, the box need not be made small and therefore it is not necessary to form a back with an extension, as is desirable in the case of the rear seat, and in Fig. 10, therefore, no such extension is shown. The compartments for the side arms are, as shown at 30, reduced in width at the top, so that the bottoms of the frames of said side arms, which, as shown in Fig. 14, are somewhat wider than the main portion of the side arms, can fit tightly in said reduced portions of the compartments and prevent rattling. These side arms are made with wide bottom pieces 74 to prevent the upholstered portions thereof scraping against the sides of said compartments when lowered thereinto. With the front seats it is possible to have a lower portion used entirely as a box or receptacle, to contain articles exclusive of the seat proper or the cushions, there being sufficient space above the box to receive said seat. For this purpose there are secured, upon the false ends of the box, ledges 50 upon which the seat can rest when not in use. When the cover is thrown back to form a seat back, then the seat 75 is raised by tags 28 and it then rests upon supports 51 which are hinged, as shown at 52, at their lower edges to said ledges, and, when not in use, are received within recesses 53, formed by inwardly extending upper portions 54 of the false ends. As soon as the seat is raised, the upper edges of said supports are projected inwardly, and the seat supports are swung upon the hinges, by means of compressed springs 76 which are received within recesses 55 formed through the false ends and in the spacing blocks. To the front ends of said supports are attached arms 56 which extend along the front edges of the supports and are then bent inwardly and then extend upwardly, as shown at 57, to form handles by which the supports can be moved back into their recesses against the pressure of said springs to permit the seat to drop between said supports and upon said ledges and rest thereon. The upper portion of the whole box or frame supporting the back and seat extends rearwardly, as shown at 58, thus leaving a space beneath said extension to accommodate the feet of the occupants of the rear seat. In said rearwardly extending portion there are secured blocks 59 which limit the swinging movement of the supports, and thus enable them to stand firmly and uphold the front seat and its occupants. These supports 51 are sloped downward to the rear so as to give a corresponding slope to the seat which rests upon them. The lower edges 60 of the supports are slightly beveled to allow of the supports resting upon the whole width of their lower edges in their supporting position. Also to allow this to be done, the hinges 52, are placed on the outside of the supports 51, so as not to interfere with the contacts between said supports and ledges. It will thus be seen that I provide for the front seat sufficient space at a considerable level from the floor to receive the seat proper and the cushions of the back, and therefore I provide a receptacle below said seat, which can be used entirely for containing other articles. In order to prevent the entrance of dirt or dust into said receptacle when raising or lowering the seat, I preferably provide a cover 62 which can rest upon mortised portions 63 of the ledges 50, and also upon ledges 64 secured to the front and back walls of the box. This cover may however be omitted if desired. 65 is a flap which is hinged at 66 to the upper portion of the front wall of the seat, and which, when the seat is closed, is raised and fits in a groove 67 in the under side of the cover near its front edge. When the seat is open and raised, said flap is lowered and is secured by means of a turn button 68, which passes through a slot in the flap, said slot being also used to secure the flap in place, when closed, by means of a staple 69 secured to the cover and passed through said flap and a hook 70 attached to said flap passing through said staple. This flap is required on account of the necessity of forming a dust proof closure in front of the box when closed, while at the same time avoiding discomfort to the occupants of the seat which would be caused by their contact with an unyielding means for making such air tight joint when the seat is in use.

Many automobiles now built or in use have on their rear portions boxes for containing tools and other necessary or convenient articles. In Figs. 12, 13, 14, I show a modified form of my invention adapted to be secured on such a box. In this form of the invention, the construction of the hinged back or cover, the means for securing the cover in place when closed, the side arms connected to the cover and swinging therewith, the compartments in which said side arms are received, the latches for supporting said side arms in their upper or open position and the means for holding the seat proper in its raised position are the same as in the form shown in Figs. 10 and 11. The main difference consists in the fact that instead of the seat and cover or back being permanently attached to a box, they are made in a separate part therefrom and are removably supported thereby, the box 71 being that already provided on the automobile. Casings 72 forming receptacles for the side arms straddle or fit down over or against the ends of the box, when in use.

In all of said forms of seat, the joint between the back and the support therefor is covered with a strip of leather or other flexible material 73, sufficiently tight to exclude the entrance of dust through the crevice between the back and the support and the deposition of dust upon the seat proper and cushions when the back is closed. It also prevents the entrance of dust to the box when the back is open.

I claim:—

1. The combination of a box having the rear side lower than the front side, the top of said rear side having an inward extension at an angle thereto, a seat back adapted to form a cover for the box and having at its lower edge an inwardly-extending offset portion, said portion hinged at its inner edge to the inner edge of said extension whereby said portion and extension lie in planes substantially parallel when extended.

2. The combination of a box having the rear side lower than the front side, the top of said rear side having an inward extension, and a seat back having at its lower edge an offset portion hinged at its inner edge to the inner edge of said extension whereby said portion and extension lie in planes substantially parallel when extended, and a movable seat supported at its front edge upon the front wall of said box and at its rear edge upon said offset portion.

3. The combination of a box having the rear side lower than the front side, the top of said rear side having an inward extension, and a seat back having at its lower edge an offset portion hinged at its inner edge to the inner edge of said extension whereby said portion and extension lie in planes substantially parallel when extended, and a movable seat supported at its front edge upon the front wall of said box and at its rear edge upon said offset portion, the front portion of the seat being of a different height from the rear portion.

4. A box seat having a box formed with the rear side lower than the front, a removable seat thereon, a combined back and cover having an off-set portion at one edge hinged at the rear side of the box, and an extension pivotally connected with the upper portion of said back and adapted to aline with said back when swung into its outer limiting position.

5. A box seat comprising a box, a movable seat supported thereon, a back hinged to the rear side of said box, a cushion upon the upper portion only of said back, an extension, links pivotally connecting said extension with said back, a cushion on said extension, said pivotal connection being such that when the extension is swung upward or downward upon the back, the cushion thereon is received in the space adjacent to the back in line with the cushion thereon.

6. A seat comprising a box, a seat proper removably supported thereon, a back hinged to the rear side of said box, an extension, links between said extension and back, and hinge members connecting the ends of said links with said extension and back respectively, said links and hinged members formed with stops which limit their outward movement to a position wherein said back and extension are in alinement.

7. The combination of a box, a seat removably supported thereon, a back pivotally connected to the rear side of said box, an extension movably connected to said back and arranged to lie in its folded and extended positions substantially in alinement therewith, devices secured to said back and box for securing the back to the box when closed, the extension being provided with a device arranged to engage the device attached to the back when opened to secure said extension in its open position.

8. The combination, with a seat, of a back therefor, an extension for said back, means for movably connecting said extension to said back, cushions for said back and extension respectively arranged thereon to meet, when the extension is extended, in a plane with that of the back.

9. The combination of a box, a combined back and cover hinged thereto, and a removable seat supported by said box, the lower side of said seat being formed with front and rear shoulders arranged to engage the supports for the seat to prevent movement of said seat upon said box.

10. The combination of a seat back having side arms fixedly secured thereto, a seat box to which said seat back is hinged, said seat box having depending from its ends a casing forming pockets or compartments spaced from each other and open at the top to receive said side arms.

11. The combination of a seat back having side arms fixedly secured thereto, a seat box to which said seat back is hinged, said seat box having depending from its ends a casing forming pockets or compartments spaced from each other and open at the top to receive said side arms, and bolts for supporting said side arms in their raised position.

12. The combination of a seat back having side arms fixedly secured thereto, a seat box to which said seat back is hinged, said seat box having depending from its ends a casing forming pockets or compartments spaced from each other and open at the top to receive said side arms, bolts and spring-actuated latches, and frames for said latches provided with means for retaining said latches in an inoperative position.

13. The combination of a seat back having side arms fixedly secured thereto, a seat box to which said seat back is hinged, said seat box having depending from its ends a casing forming pockets or compartments spaced from each other and open at the top to receive said side arms, bolts and spring-actuated latches, said springs being arranged to press said latches against said bolts when the seat is in use to prevent rattling.

14. The combination of a seat back having side arms fixedly secured thereto, a seat box to which said seat back is hinged, said seat box having depending from its ends a casing forming pockets or compartments spaced from each other and open at the top to receive said side arms, bolts and spring-actuated latches, frames for said latches having depressed portions, and fingers attached to said latches and moving in said depressed portions.

15. The combination of a seat frame, a combined cover and back pivotally connected thereto, a seat, and seat supports pivotally connected at their lower portions to said seat frame, and adapted to be swung back when the seat is in its lower position, and adapted to be swung out to support the seat when the seat is in its raised position, and springs for normally projecting said seat supports.

16. The combination of a seat frame, a combined cover and back pivotally connected thereto, a seat, and seat supports pivotally connected at their lower portions to said seat frame, and adapted to be retracted in lowering the seat, and adapted to be projected to support the seat when the seat is in its raised position, and springs for normally projecting said seat supports, and upwardly extending arms connected to said seats and movable therewith.

17. The combination of a seat frame having recesses, a combined cover and back pivotally connected thereto, a seat, and seat supports pivotally connected at their lower portions to said seat frame, and received within the recesses in said seat frame when the seat is in its lower position, and adapted to be swung out from said recesses to support the seat when the seat is in its raised position, and stops limiting the movement of said supports from their recesses.

18. The combination of a seat box arranged to be removably supported upon a vehicle, a combined cover and back pivotally connected to said seat box, side arms fixedly secured to said cover and back, and casings forming pockets adapted to receive said side arms.

19. The combination of a seat back having side arms fixedly secured thereto, a seat box to which said seat back is hinged, said seat support having walls forming pockets or compartments spaced from each other and open at the top to receive said side arms, and means for securing said side arms in their raised position against either upward or downward movement.

In testimony whereof I have hereunto set my hand in the presence of two subscribing witnesses.

ARTHUR F. DRAPER.

Witnesses:
FRANCIS M. WRIGHT,
D. B. RICHARDS.

Copies of this patent may be obtained for five cents each, by addressing the "Commissioner of Patents, Washington, D. C."